Aug. 5, 1947.  A. C. PETERSON  2,425,121
COMBUSTION JET PROPULSIONED MEANS
Filed Jan. 12, 1944  4 Sheets-Sheet 1

Aug. 5, 1947.  A. C. PETERSON  2,425,121
COMBUSTION JET PROPULSIONED MEANS
Filed Jan. 12, 1944  4 Sheets-Sheet 3

Inventor
Adolph Peterson

Patented Aug. 5, 1947

2,425,121

UNITED STATES PATENT OFFICE 2,425,121

COMBUSTION JET PROPULSIONED MEANS

Adolphe C. Peterson, Minneapolis, Minn.

Application January 12, 1944, Serial No. 518,199

7 Claims. (Cl. 60—35.6)

My invention relates to propulsion means particularly for aircraft, which propulsion means embodies especially a form of combustion jet propulsion, wherefore is called combustion jet propulsioned means.

The particular object of this invention is the improvement of the form of engine or propelling means for aircraft which is generally known as the jet-engine. It is especially an object to provide an improved form of jet-engine for the driving of aircraft in flight in the air and such improvement consists generally in means deemed effective to increase the effectiveness of jet propulsion in air, whether such jet propulsioned engine be used on aircraft or other craft traveling on land or water. An object is in connection with its use on the sea for water borne ships, to provide this type of propulsion in a form which permits of its operation and effective use with elements of its means immersed in water. An object is also in connection with the power generating means to provide a novel form of propulsion generating jet or discharge means which is efficient and renders the jet propulsion effective. An object is in connection with the power generating means to provide a novel form of control for the gas and air flow in the power generating means which will provide especially for increase of effective power generation and effective pressure and velocity of the jet propulsion. In general the object is to provide means of the nature of that described in an improved and practicable form, and especially in such a method and means of operation as will provide increased speed especially in aircraft utilizing this invention.

The particular devices and combinations of devices comprising my invention, are as hereinafter described, and as defined in the appended claims. In the accompanying drawings which illustrate my invention in several different forms, like characters refer to like parts throughout the several views. Referring to the drawings:

Figure 6 shows auxiliary charge supplying means diagrammatically, by the dotted lines there shown.

Figure 7 is on a scale considerably less than that of Figure 1, and shows part of one combustion unit in full plan view.

Figures 1, 11:
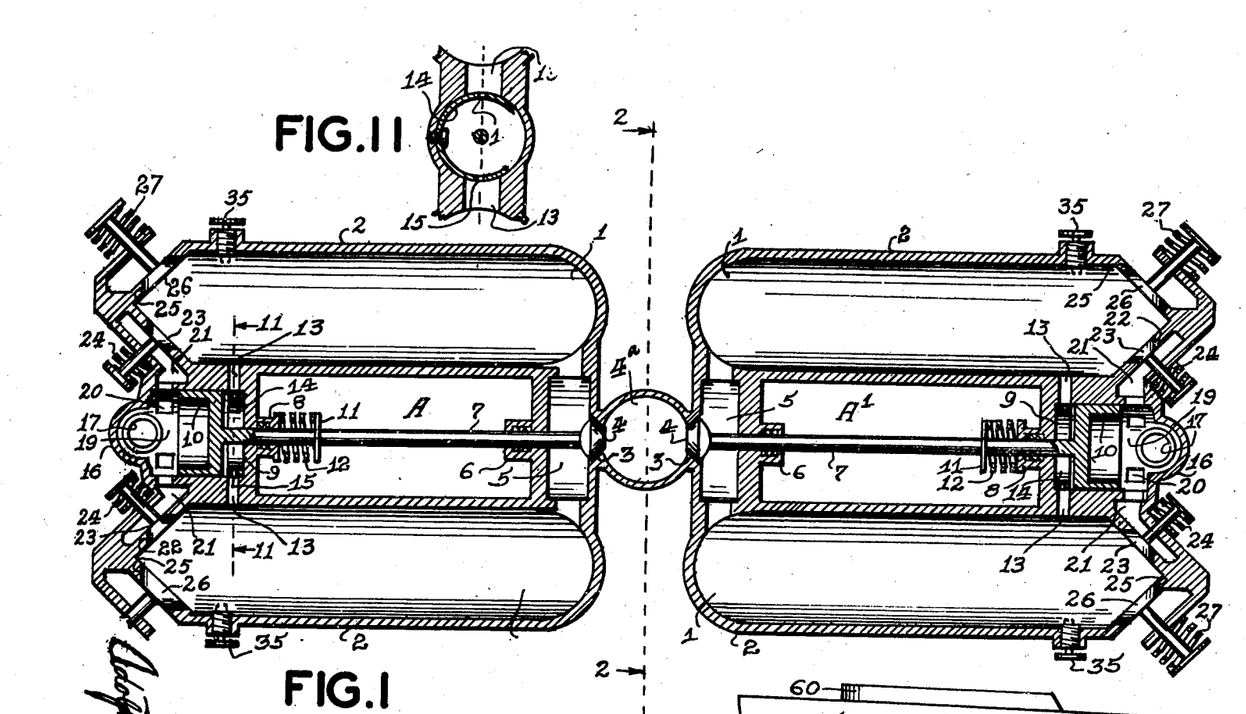
Figure 1 is a view of the principal elements of the power generating means of a propulsion unit, this section being on a scale larger than that of the other views, and being a section on the line 1—1 of Figures 2 and 13, is on a horizontal plane through two combustion units on one level, these two combustion units being two of the four combustion units associated with or included in one propulsion unit as shown, some parts in plan view.
Figure 11 is a detail vertical transverse section on the line 11—11 of Figure 1, to show in cross section a gas pressure admission valve having return flow retarding ability.

Referring first to Figures 1 to 11, both inclusive (except Figs. 7 and 9), and especially first to Figure 1 which shows a pair of the combustion units of one propulsion unit, the pair of combustion units of which there are four associated in one propulsion unit, are each comprised of two combustion chambers, each denoted 1, and each chamber is formed in a cylindrical steel or alloy casing 2. The two combustion units as shown in Fig. 1, in horizontal cross section are denoted A and A¹, respectively. These two combustion units are on one level, a plane passing horizontally through the longitudinal axial centers of all of the four chambers 1 comprising them. On the line 1ᵃ—1ᵃ of Fig. 2 there is a set of two combustion units B and B¹, respectively, only the set B¹ being shown in Fig. 2, and each of these sets B and B¹, have two combustion chambers each denoted 1 and each is formed in a cylindrical steel or alloy casing denoted 2. A horizontal section on the line 1ᵃ—1ᵃ is not shown as this section would be identical with that of the line or level 1—1 shown in Fig. 1.

Each combustion unit A and A¹ and B and B¹, delivers by an independent port, each denoted 3, into a common expansion conduit 4ᵃ. Each port 3, from one combustion unit, is normally closed, but opened as hereafter described, by a poppet valve 4 associated with it. Each port 3 of a combustion unit delivers to common conduit 4ᵃ from a communication conduit 5 of the associated combustion unit, and this communication conduit 5 connects permanently the adjacent ends of the two combustion chambers 1 of the combustion unit. There is only one poppet valve 4 for each combustion unit and this valve has extending from it through a packed bearing 6, a valve rod 7, and the latter at its opposite end passes slidably through another packed bearing 8 and into a valve chamber 9 where it is formed with or fixed to a cylindrical piston valve 10 and the latter is reciprocable in valve chamber 9. The rod 7 has a collar 11 fixed on it between the two bearing boxes or bearings and a coil spring 12 is compressed between the collar 11 and the packed bearing 8, so that the valve rod 7 with its attached poppet valve 4 is thus normally yieldably seated against its seat on port 3 by that coil spring denoted 12.

The valve chamber 9 on one side of piston valve 10 is connected by ports 13 with the adjacent ends of the combustion chambers 1 of the combustion unit. These ports 13 are comparatively large and will provide for rapid passage of a considerable volume of gases from the adjacent combustion chambers 1 into the associated end of valve chamber 9 by the lifting of the ends of the associated leaf valve 14 which is placed on the adjacent inner wall of valve chamber 9 and fixed at its center to that wall by a screw, as shown by the transverse section of the valve 14 in Figure 11. The latter is formed of spring steel as a leaf spring so it will bend at each end when pressure of gases forces it away from its seat on the adjacent wall. At the location where the spring valve 14 closes the adjacent port 13 there is formed in the valve 14 a small port 15, smaller than port 13, so that thereby there is a free return of gases from valve chamber 9 to the adjacent combustion chambers 1 from which the gases came, but at a considerably slower rate than the passage of gases from chambers 1 adjacent, to the valve chamber 9 between them.

The opposite side of the piston valve 10 formed by that side and the adjacent wall of the cylindrical valve chamber and the closure cap 16 forms a chamber into which carburetted air may flow from a branch 17 of a common carburetted air conduit 18. This chamber, denoted for distinction, as 19, normally is in open communication at its sides through ports 20 with the two valve chambers 21 each associated with one of the two adjacent combustion chambers forming the combustion unit, and each of the valve chambers 21 has a port 22 delivering from it to the adjacent combustion chamber 1 of the unit, but that port 22 is normally closed by a poppet valve 23, each of the latter normally held closed by a yieldable coil spring 24, but so lightly held that it is permitted to open when there is pressure of carburetted air in the valve chamber 21. Such carburetted air is not permitted to flow from chamber 19 to the valve chamber 21 and thereby by way of the poppet valve 23 and port 22 to chamber 1 when the poppet valve 4 of the unit is opened as the piston valve 10 then closes the ports 20.

Figures 2, 3, 4, 5:
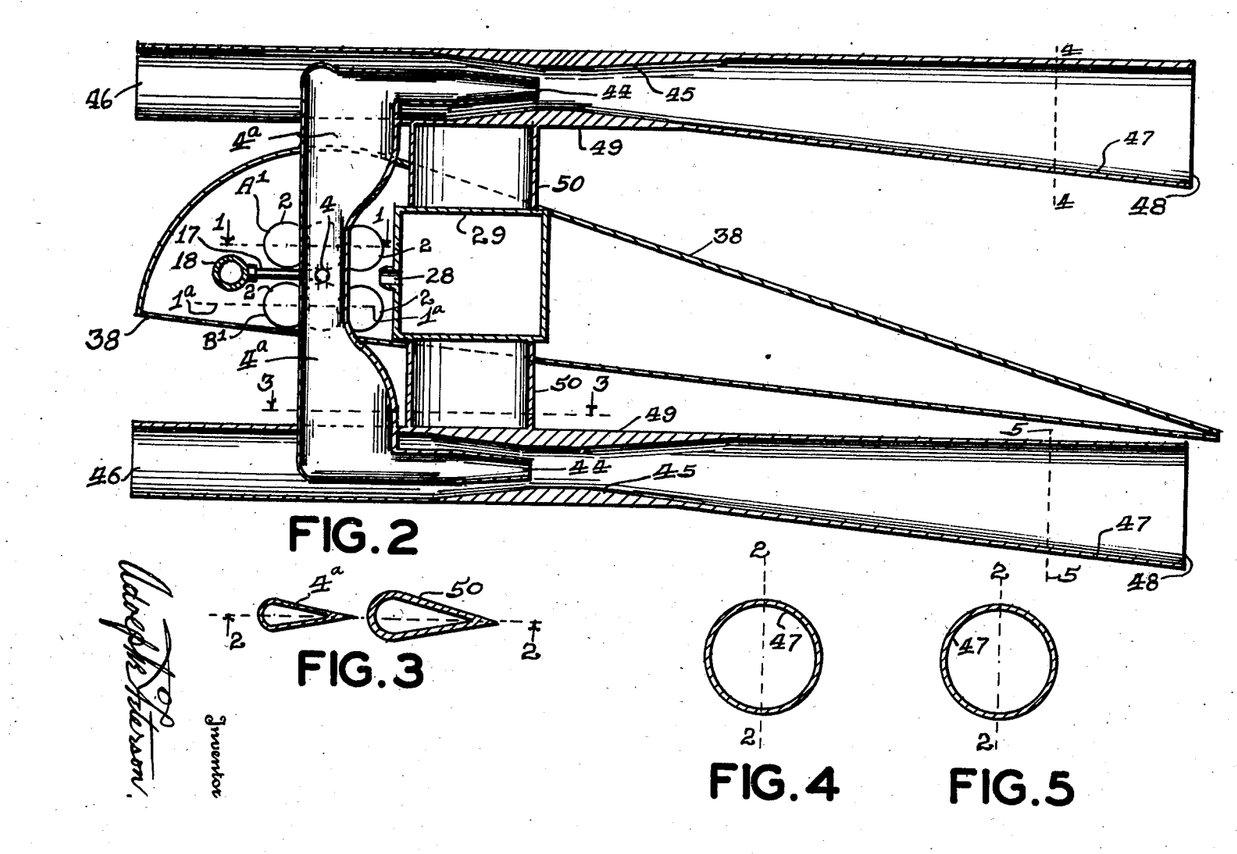
Figure 2 is a view in vertical section at right angles to the section of Figure 1 on the line 2—2 of Figures 1, 3, 4, 5, 6 and 13, this view showing a vertical section longitudinally and centrally through one propulsion unit as that unit is applied to an aircraft of the airplane type, this section and view being on a scale approximately one-third that of Figure 1.
Figure 3 is a horizontal detail section taken on the plane 3—3 of Figure 2 transversely of one of the branch gas-flow conduits and the adjacent jet-nozzle supporting structure elements beneath the wing. It should be noted that the similar set of elements above the wing are similar in transverse cross-section, and also that the two elements shown may be in any manner made in a streamlined structure and their functions served by one element, the two being shown for simplicity in illustration of the operation.
Figure 4 is a detail vertical section on line 4—4 of Fig. 2.
Fig. 5 is a similar vertical section on line 5—5 of Fig. 2, each at right angles to the section of Figure 2, and each showing a transverse section of one nozzle.

Each combustion chamber 1 has, at the same end of the cylinder as that occupied by its poppet valve 23, a port 25, normally closed by a poppet valve 26, and the latter is yieldably held closed but lightly by its coil spring 27, associated. The ports 25, one for each combustion chamber 1, as controlled by poppet valve 26, permits delivery of air under light pressure from the surrounding space within the wing of the aircraft, to which space air is constantly delivered under low pressure by the air nozzles 28 delivering from the space interiorly of the main transverse beam 29 of the aircraft. This delivery of air is directed by the air nozzles 28 to provide for as uniform cooling as possible of the exterior wall of the cylinders 2 enclosing the chambers 1. The interior space of beam 29 forms a conduit conveying air from the low pressure centrifugal or rotary air compressor 30 by way of conduits 31. The common carburetted air conduit 18 is common to all combustion units of all propulsion units of the air craft and receives and delivers this carburetted air at a pressure which should be at least as high as thirty pounds per square inch and may be as high as say one hundred pounds per square inch, this pressure depending on the characteristics of the compressor 32, and on the pressures for which the various elements of the propulsion units are computed and designed for most effective power production under the circumstances of each particular construction and its designed use. The common carburetted air conduit 18 receives this carburetted air from the carburetted air compressor or blower 32 and the latter receives it from the carburettor 33, which in turn receives air from atmosphere and fuel, preferably gasoline, from the fuel conduit 34. (It should be noted that the compressor 32 may deliver air and fuel may be injected to the air passing to the common carburetted air conduit 18.) The means carburetting the air is not specifically shown as it is contemplated that any means commonly used for this purpose may be used or in lieu thereof any fuel pumping and injecting means may be used. The means utilized will deliver preferably a mixture which is rather over-rich in fuel.

The carburetted air compressor 32, and the low pressure air compressor 30 are shown diagrammatically only and are contemplated to have associated with them the necessary air induction ports permitting entry of air from atmosphere, the compressor 32 receiving such air by way of the carburettor 33 and the compressor 30 receiving such air directly from atmosphere, or by any means such as is commonly used for scooping air from the atmosphere in flight of an airplane. Such means are common to carburettors and air compressing means commonly used and are not therefore more specifically shown.

Each combustion chamber 1 has in its side near the port of entry of carburetted air, a spark plug 35 which is adapted to generate electric ignition sparks at periods, periodically, when high tension current is distributed to the spark plug by the current distributing means 36, the latter being diagrammatically shown only, as it is contemplated this will diagrammatically illustrate the intent to use for that current distribution any means as commonly used with engines for distributing electric current for spark ignition in cyclic order and periodically to the spark plugs 35, as current is distributed in cyclic order to the cylinders of a spark ignition internal combustion engine. Any current supply and transformer means may be used in connection.

The carburetted air compressor 32, the compressor 30 and the current distributing means 36, are all driven by one common motor means or engine or turbine 37, and the latter is of a capacity to supply the required low pressure air to the conduit within the beam 29 and thereby to nozzles 28 and to deliver the required higher pressure carburetted air to conduit 18 for all the combustion chambers 1 of all the combustion units and of all propulsion units. In lieu of one such supply unit several may be used, for greater reliability. It is contemplated that any turbine means such as a gas turbine may be used for this purpose, and this auxiliary power means for the compressor means will not be of relatively great power as the power production is very largely in the propulsion units for the aircraft, the auxiliary power unit supplying power for the compression only.

The main beam 29 is the transverse beam forming the support of the wing 38 of the aircraft, and the beam 29 is fixed on and supports the fuselage 39 in flight. The auxiliary power means and the compressors are preferably located in the fuselage 39. The latter has the pilot's cabin 40, and the empennage structure having horizontal stabilizer 41, elevator 42, and rudder 43, each of the latter being controlled by any means as is customary in airplanes.

The common conduit 4ᵃ may be an expansion conduit and delivers at each of its ends into an expansion or velocity creating nozzle 44. There are two nozzles 44 for each conduit 4ᵃ and thus two for each propulsion unit, these two nozzles 44 serving as the outlet for all the gases from all the exhaust ports 3 of all the eight combustion chambers 1 forming the combustion chambers of one propulsion unit. The ports 3 will exhaust in cyclic order to the conduit 4ᵃ and thus to the two nozzles 44 associated with it.

The conduit 4ᵃ is a vertical conduit and the nozzles 44 are located one above the location of wing 38 and the other below wing 38 and each is located within a so-called Venturi chamber 45 which has at one end the air-receiving or suction port 46 and at the other end has the expansion and velocity nozzle 47 discharging through the large open mouth 48 to atmosphere behind the discharge unit which may be generally called a velocity or expansion tube, and is generally designated 49. There are thus two of these expansion tubes, one below the wing and the other above, and both are fed with gases under high pressure and velocity issuing from the nozzles 44, and the spout of one of the latter is directed centrally and rearwardly into the Venturi section of its associated expansion tube 49, and the spout of the other is similarly directed centrally and rearwardly into the Venturi section of the other expansion tube 49, so that each tube 49 has delivery of gases at high velocity into its restricted central section to thereby exert injection effect by the velocity of the issuing gases against air around the spout of the nozzle 44 in the venturi, and thus to exert suction effect on air in the forward end of the expansion tube 49, whereby there is created a vacuum effect in that forward receiving end of the expansion tube 49, and that receiving end being directed forwardly of the flight of the craft there will be a forward propulsion effect on the main beam or spar 29 through the streamlined support member 50 by which the expansion tube is rigidly supported in its position relative to wing 38, as shown in Fig. 2, and in Fig. 8. The expansion tubes 49 are so located relative to wing 38, that the axial longitudinal center of each lies parallel to the axial longitudinal center of the fuselage 39 in flight. Each expansion tube 49 rearwardly of the Venturi section of each, gradually expands toward its rearward end or discharge mouth 48, and the pressure and velocity of gases mixed with air drawn into the receiving end, and issuing in large volume from the rearwardly directed end of the tube will exert large forward propulsion effect on the support or strut 50 and thereby on the wing beam 29, which coupled with the suction or vacuum effect of the forwardly directed receiving end of the tubes 49 creates in the aggregate the propulsive effect on the aircraft of the propulsion unit, which has been described. There are as shown in the general plan and frontal view of the airplane in Figs. 6 and 8, four of the propulsion units each denoted generally as X and they are spaced on the wing 38, generally as engines are spaced in an airplane.

It is contemplated that the aircraft will be provided with any type of landing gear as yieldably support wheels for take-off and landing or that the fuselage 39 will be so constructed as to be a hull floating on the water, for take-off and landing on the water. Any form of fuel supply reservoir will be provided in the fuselage or wing spaces to supply the fuel supply pipe 34 of carburettor 33. In operation, in preparation for take-off the pilot or operator will first start the turbine or engine 37 of the auxiliary supply means in operation by any means such as may be provided for such starting and may operate it at slow speed until air pressure is accumulated. He then turns the fuel supply into the carburettor 33 by any control means for the carburettor 33 or permits air to pass by such means as a butterfly valve with which carburettors are usually provided, and simultaneously causes the electric current distributing means 36 to supply current for sparking in the spark plugs 35 of each propulsion unit in cyclic order as to the combustion chambers 1 of each propulsion unit. Ignition sparks will then occur in the combustion units of each propulsion unit X in cyclic order according to the diagrammatic sketch shown in Fig. 10, there being two spark plugs 35 for each combustion unit in its respective combustion chambers 1. The pressure of carburetted air will fill the combustion chambers 1 or there will be a residue of uncombusted fuel and air mixture from a previous operation. As sparks occur according to the cyclic order the chambers will take up their cycle which is as follows, the cycle being alike for each combustion unit of a propulsion unit, the cycle being described as to one combustion unit: As ignition occurs in a combustion unit, the gases in the two chambers 1 of the unit will explode or there will be combustion of the explosive mixture in the two chambers 1 simultaneously; this combustion will create a high pressure several times the pressure of the mixture, which is say thirty pounds, and the explosive pressure will therefore be say one hundred pounds or over, depending on the mixture and the mixture pressure; the springs 12 are proportioned to this pressure, so that as soon as a pressure somewhat over the mixture pressure of thirty pounds is attained in valve-chambers 9 by flow past valves 14 through ports 13, the pressure acting on piston valve 10 will cause the piston valve 10 and with it rod 7, and poppet valve 4, to move in the direction opening port 3 and simultaneously closing ports 20 of the carburetted air supply; thereupon gases of combustion at their high pressure of combustion will issue into conduit 4ᵃ from the two combustion chambers 1 simultaneously causing increase of pressure therein and this gas pressure flow will continue for a brief period as combustion continues and is completed. As combustion is completed in the chambers 1 of the unit, pressure will decrease therein and fall to approximately the lowest pressure of the cycle which is somewhat below the pressure of the carburetted air mixture and also below the pressure of the low pressure air supply; thereupon the gases in valve chamber 9 will slowly issue through ports 15 flowing back to chambers 1, and when pressure is lowered in valve chamber 9 piston valve 10 will be caused to move backwardly to the starting position by spring 12; poppet valve 4 will now be closed against valve seat 3, and ports 20 will be opened so that carburetted air under pressure from common conduit 18 will flow through ports 20 and by its pressure open poppet valves 23 so that carburetted air flows to combustion chambers 1. Prior to this flow of carburetted air however, owing to the delay in the movement caused by the restricted flow through ports 15 of gases from valve chambers 9, air from the space about the cylinders 2 and from interior of beam 29, will have had time to flow into chambers 1 by way of ports 25 by the automatic opening of valves 26, so that fresh air to some extent has preceded the flow of carburetted air; the cylinders 2 are long and the flow of fresh air precedes the carburetted air in the chambers 1 and some fresh air will flow to conduit 4ᵃ before closing of port 3 by valve 4.

As the chambers 1 fill again with carburetted air together with some of the preceding fresh air which has swept out exhaust gases, the time has passed in the cycle so that the ignition sparks will again be caused to occur in spark plugs 35 of the unit and the ignition and explosion and similar cycle will again occur.

The distributor 36 is timed to distribute current to procure the cycle stated and to allow sufficient time for surging of the flow to conduit 4ᵃ from the four associated combustion units of the propulsion unit, that is, in such delayed time that each combustion unit substantially completes its cycle so that some flow of fresh air is permitted between the flows from the combustion units into each combustion unit, as its cycle is nearly finished, by way of its ports 25 prior to the flow of carburetted air, thereby ensuring exhaust of exhaust gases and ceasing of combustion in the unit prior to entry of carburetted air and so that also the piston valves 10 will function in the manner indicated. Thus there will be in cyclic order four surges of exhaust gases each at high pressure into conduit 4ᵃ and four brief intermediate flows of fresh air. The spark ignitions are timed to be as close together as possible and permit of this functioning. It is contemplated that the combustion will be so rapid owing to the explosive nature of the carburetted air mixture, that the cycle of a combustion unit will be completed in a very brief time, and that therefore the cyclic order of the combustion units of a propulsion unit will be completed in substantially or nearly the time required for completion of a cyclic order in the internal combustion engines commonly used. Thus the number of cycles per minute will be very great. This number of cycles will cause a nearly constant flow at the nozzles 44 ejecting gases into expansion tubes 49, so that there will thus be a large volume of gases issuing in very rapid succession in surges such as to constitute almost continuous discharge. In some constructions this flow may be substantially continuous at nozzles 44 due to equalization caused by flow in the conduit 4ᵃ to nozzle 44. This will result from the fact that as the gases recede from ports 3 through conduit 4ᵃ in the opposite directions, the gases will attain high velocity due to some conversion of the pressure and heat of combustion into velocity of the gases at a somewhat lesser pressure but high velocity.

The gases issuing from nozzles 44 by their action in the venturi of tubes 49 cause great induction of air from atmosphere by way of receiving end 46 of the tubes 49, this receiving end being open to atmosphere, and there is thus a very great flow of mixed exhaust gases and air to the expanding and velocity increasing rearward end of tubes 49, as the gases flow therethrough to the rearward open mouths 48. The reaction effect of the great volume of mixed exhaust gases and new air at great velocity and some pressure above atmosphere, causes great propulsive effect forwardly on the aircraft structure, and this effect is increased by the great vacuum effect caused in the forwardly extending end of tubes 49, forwardly of nozzles 44, whereby receiving ends 46 are subjected to this vacuum effect and this is thus transmitted to the aircraft structure. Generally this propulsive effect on the aircraft will be utilized in low-pressure strato-spheric atmosphere, where the speed of the aircraft will be relatively great and the propulsive effect of the gas and air movement through the tubes 49 is most pronounced and great compared with the retarding effect of the atmosphere on the aircraft. I contemplate that the form of the expansion tubes, which also constitute vacuum-creating or suction tubes, forwardly, will be such as may be determined for any particular construction and power to be most efficient and appropriate, and especially that this form will be determined with due regard to the altitude of travel for which the aircraft is designed. While each propulsion unit is shown as having two of the expansion tubes, this number may be any larger number or there may be only one such tube for each propulsion unit.

Figures 6, 7, 8, 9, 10:
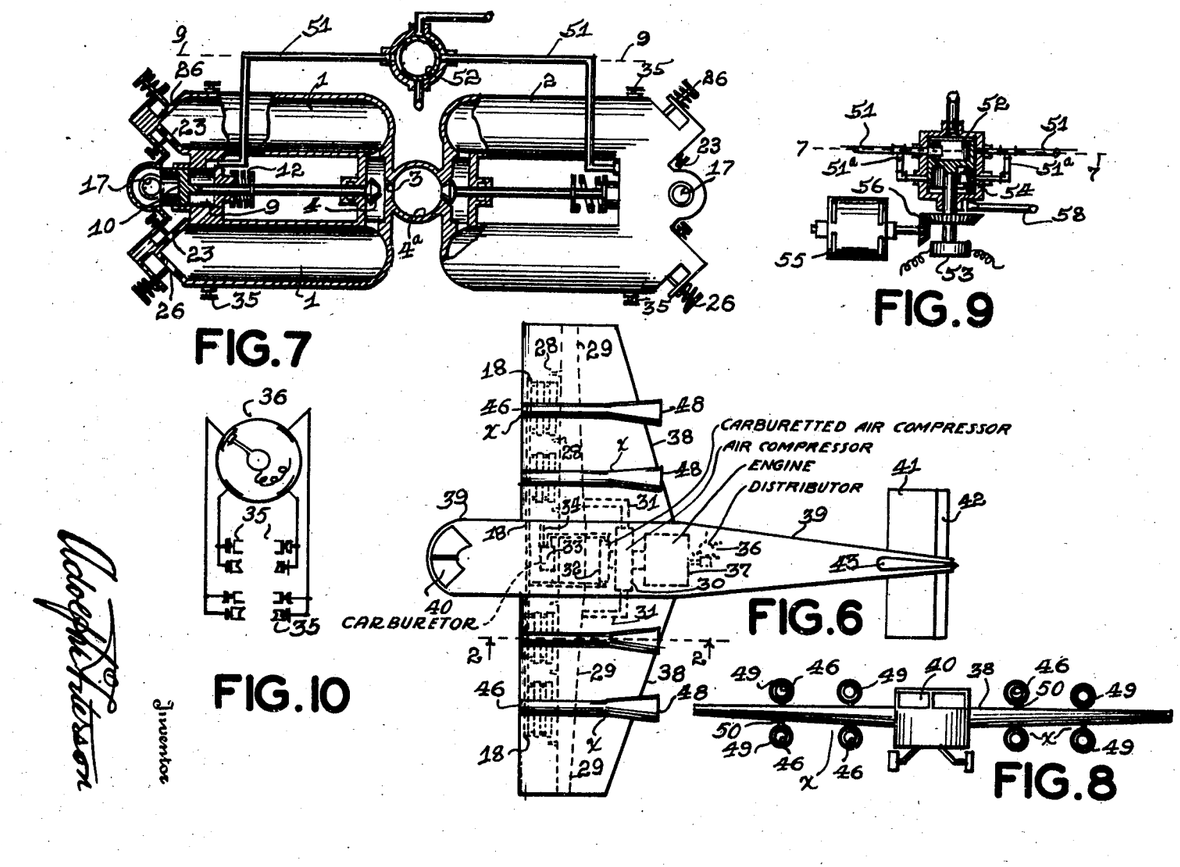
Figure 6 is a plan view of an aircraft of the airplane type embodying my invention, this plan view being on a scale very much less than that of Figure 2 and therefore on a scale still smaller than Figure 1, and showing four of the propulsion units as applied to this aircraft, each such unit embodying four of the combustion units of which two are illustrated in Figure 1.
Figure 7 shows a modified form of combustion control means of a cyclic control character to govern gas flow to the nozzle means, the valve 52 being sectioned on the line 7—7 of Figure 9.
Figure 8 is a frontal elevation of the aircraft shown in Figure 6, and on the same scale as Figure 6.
Figure 9 is a detail vertical section on the line -9- of Figure 7, to show in detail the distributing means for distributing fluid controlling the cyclic operation of the main valve means of the modified form of combustion unit, and for current control.
Figure 10 is a diagrammatic sketch showing the distribution means for supplying ignition spark or incandescent means with current by rotating distributing means, this means being shown diagrammatically only, as such means are commonly utilized in combustion means.

Referring now to Figures 7 and 9, these figures show a modified form of control for the combustion cycle of combustion units, and this control is shown in connection with a set of four chambers or combustion units, as in Fig. 1, but on a considerably reduced scale. The valve chambers 9 do not in this form have communication through ports 13 with chambers 1 to supply pressure gases for move nent of the valve, but instead there is provided in this form of control, a fluid conduit (preferably hydraulic fluid) for each valve chamber 9, that is one for each combustion unit of chambers 1, and this fluid conduit denoted 51 delivers fluid under pressure under control of a distributing valve 52 to the valve chamber 9 on the side of the valve 10 opposite to that of the carburetted air from branch conduit 17 and thereby from carburetted air conduit 18. Once in each cycle fluid under pressure flows through conduit 51 to the chamber 9 and in alternative period this fluid is permitted to return therefrom. When the fluid pressure is high, the piston valve 10 is moved to open the poppet valve 4 from its port 3 and thereby to permit the discharge of the gases of combustion under their high pressure of explosion. This opening of the valve 4 is timed by distributing means shown in Fig. 9, in detail, to occur immediately after the ignition is timed to occur in the combustion by spark plugs 35, by means of current distributed by the electric high tension current distributing means 53 shown in Fig. 9 which current distribution is timed in harmony with the fluid distributions through conduits 51 to procure the same sequence for each combustion unit of the propulsion unit. The distributing means by valve 52 and conduits 51ª and ports 54 provides for release of fluid from each chamber 9 in cyclic order to occur so as to permit valve 10 to close poppet valve 4 at the appropriate time, that is, when the pressure of combustion has exhausted itself into conduit 4ª, and when pressure has been lowered sufficiently so as to permit opening of valves 23 and 26, as in the first form described, so that the air flow and then the carburetted air flow will occur to chambers 1 as in the first form described. The distributing valve 52 and the electric current distributing means 53 are driven in the same time or speed by means of a small electric motor 55 driving through the mitre gears 56. Each propulsion unit of an aircraft may have an electric and fluid distributing means of this type, and such means will receive fluid under pressure from a common supply conduit 57 and the return flow of released fluid may be by way of a return flow conduit 58, to the source of fluid pressure which may be of any kind operated by the main air pumping engine 37 or any other means.

The modified control means shown in Figs. 7 and 9, will have a speed of rotation to procure a timed sequence for the combustion units in a propulsion unit closely approximating the sequence and timing of the units of the first form described.

Figure 12:
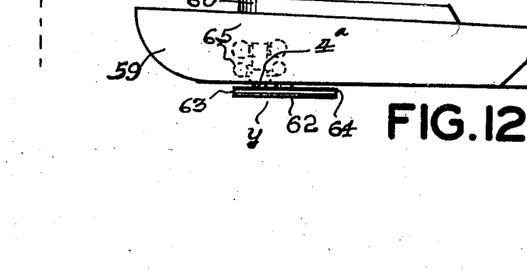
Figure 12 is a view in side elevation on a very small scale showing the application of one of my propulsion units to propulsion of a sea-craft for traveling on water, the nozzle means to be immersed in water.
Figure 13:
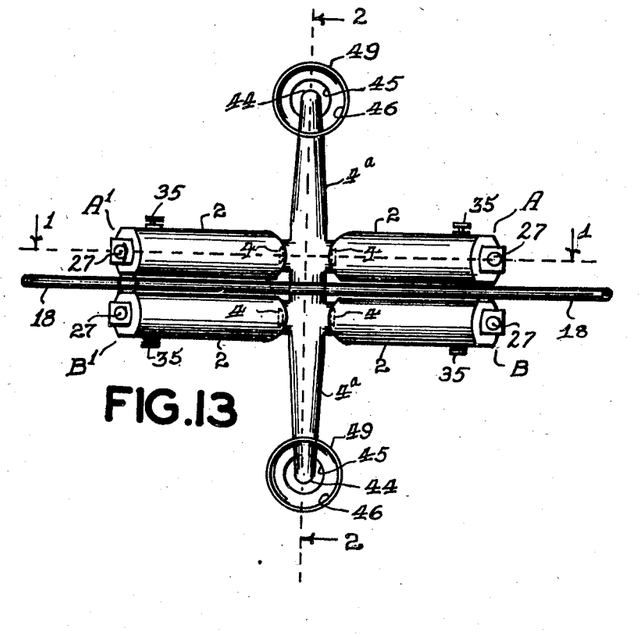
Figure 13 is a front elevation of the propulsion unit shown in Figures 1 and 2, this view on the scale of Figure 2, the unit being shown without the wing 38 and beam 29.

Referring now to Fig. 12, this shows an application of my propulsion unit to the propulsion of a water born or sea-borne craft. This craft has the hull 59 and super-structure 60 as in ships of the sea and has the rudder 61. A propulsion unit is generally denoted Y and this has an expansion tube denoted 62 which is generally of the same type as one of the tubes 49 in the air-application. The expansion tube 62 has a forwardly directed open mouth 63 which corresponds to receiving end 46 of the aircraft structure, and has the discharging mouth or nozzle 64, corresponding to nozzle mouth 48. The tube 62 receives the gases of combustion by means of a nozzle within it similar to nozzle 44 and the latter receives the gases from the combustion unit denoted 65, one tube 62 only being shown. This may have any number of combustion units as in the first form or application, these delivering through the conduit 4ª to the nozzle within tube 62. The tube 62 is immersed in the water on which the craft is borne, and the tube 62 has its axis substantially parallel to the direction of forward movement of the craft, underneath the ship. The flow of exhaust gases from the combustion units into conduit 4ª and thereby for discharge into the venturi of the tube 62, as in the first application, causes a suction from the receiving end of the tube so that water is drawn in there, and is discharged at the rear end of tube 62 together with the gases of combustion from the combustion units. The delivery of gases from the combustion units is substantially in the same manner as in the first application, as nearly continuous as the combustion cycle will permit, and this produces the constant suction and flow of water at a high velocity through the tube 62, which thereby causes the propulsive effect, as in the first application described. It should be observed that the closing of the poppet valves 4 of combustion units should be timed to produce as nearly a continuous flow of gases as possible so that the flow of water will be so uninterrupted through tube 62 as to permit of no entry of water through ports 3 into the combustion chambers 1 of the unit. The pressure of the air flow and the carburetted air flow should be such as to entirely prevent such return from conduit 4ª into the chambers 1, and the air pressure may in this application, preferably, be higher than in the first application as described.

While I have shown particular devices and combinations of devices in the illustration of my device, I contemplate that other detailed and accessory devices may be used in the realization of my invention, within the scope of the following claims.

What I claim is:

1. In a means producing flow of combustion gases under pressure to a discharge conduit, a combustion unit comprised of a pair of combustion chambers, the said combustion chambers being at one end of each in communication with each other and having a discharge port therefrom to said discharge conduit, a discharge valve for said discharge port and an associated yieldable means arranged to maintain said discharge valve in position closing said discharge port, a pressure responsive means and a chamber therefor arranged to be in permanent communication on one side with said combustion chambers, the said pressure responsive means being connected with said discharge valve to move said discharge valve to open said discharge port under pressure against said pressure means exceeding the retaining force of said yieldable means, air supply means supplying air under pressure above atmospheric and in communication with said combustion chambers and non-return valve means permitting flow from said air supply means to said combustion chambers, the said last named communication having closing valve means therefor connected with said pressure responsive means to be moved thereby to close said communication when the pressure of combustion against said pressure responsive means exceeds the retaining force of said yieldable means, and means whereby said air is supplied with fuel for combustion therewith in said combustion chambers.

2. In a means producing flow of combustion gases under pressure to a discharge conduit, a combustion unit comprised of a pair of combustion chambers, the said combustion chambers being in communication at adjacent ends of each of the pair and having a discharge port therefrom to said discharge conduit, a discharge valve for said discharge port and an associated yieldable means arranged to maintain said discharge valve in position closing said discharge port, a pressure responsive means and a pressure chamber therefor arranged to be in permanent communication with said combustion chambers, such communication having controlling means therefor to permit rapid flow to said pressure chamber but slower return flow therefrom, the said pressure responsive means being connected with said discharge valve to move said discharge valve to open said discharge port under pressure in said pressure chamber exceeding the retaining force of said yieldable means, air supply means supplying air under pressure above atmospheric and in communication with said combustion chambers and non-return valve means permitting flow from said air supply means to said combustion chambers, means whereby said air is supplied with fuel for combustion therewith in said combustion chambers.

3. In a means producing flow of combustion gases under pressure to a discharge conduit, a combustion unit comprised of a pair of combustion chambers, the said combustion chambers being in communication at adjacent ends of each of the pair and having a discharge port therefrom to said discharge conduit, a discharge valve for said discharge port and an associated yieldable means arranged to maintain said discharge valve in position closing said discharge port, a pressure responsive means and a pressure chamber therefor arranged to be in permanent communication with said combustion chambers, such communication having controlling means therefor to permit rapid flow to said pressure chamber but slower return flow therefrom, the said pressure responsive means being connected with said discharge valve to move said discharge valve to open said discharge port under pressure in said pressure chamber exceeding the retaining force of said yieldable means, air supply means supplying air under pressure above atmospheric and in communication with said combustion chambers said last named communication having closing valve means therefor connected with said pressure responsive means to be moved thereby to close said communication when the pressure of combustion against said pressure responsive means exceeds the retaining force of said yieldable means, and means whereby said air is supplied with fuel for combustion therewith in said combustion chambers.

4. All of the means as set out in claim 3 and in combination, a means for supplementary air supply to said combustion chambers and a communication therefrom to said combustion chambers and non-return valve means in said communication to permit flow to said combustion chambers during periods of low pressure in said combustion chambers prior to communication of said first named air supply with said combustion chambers.

5. In a means producing flow of combustion gases under pressure to a discharge conduit, a combustion unit comprised of a plural number of combustion chambers, the said combustion chambers being arranged radially about a longitudinal axis therebetween, a communication between said combustion chambers at one end of said longitudinal axis and a discharge port therefrom to said discharge conduit, a discharge valve for said discharge port arranged to be movable in the direction of said longitudinal axis and an associated yieldable means arranged to maintain said discharge valve in position closing said discharge port, a pressure chamber formed in said longitudinal axis between said combustion chambers and a pressure responsive means movable along said longitudinal axis therein, the said pressure chamber being open on one side of said pressure responsive means to said combustion chambers and their communication, the said discharge valve being in connection with said pressure responsive means to be moved thereby to open said discharge port under pressure in said combustion chambers exceeding the retaining force of said yieldable means, air supply means supplying air under pressure above atmospheric and in communication with said combustion chambers, said last named communication having closing valve means therefor to close said communication when the pressure of combustion against said pressure responsive means exceeds the retaining force of said yieldable means, and means whereby said air is supplied with fuel for combustion therewith in said combustion chambers.

6. In a means producing flow of combustion gases to a discharge conduit, a combustion unit comprised of a plural number of combustion chambers, the said combustion chambers being arranged radially about a longitudinal axis therebetween, a communication between said combustion chambers at one end of said longitudinal axis and a discharge port therefrom to said discharge conduit, a discharge valve for said discharge port arranged to be movable in the direction of said longitudinal axis and an associated yieldable means arranged to maintain said discharge valve in position closing said discharge port, a pressure chamber formed in said longitudinal axis between said combustion chambers and a pressure responsive means movable along said longitudinal axis therein, the said pressure chamber being open on one side of said pressure responsive means to said combustion chambers and their communication, the said discharge valve being in connection with said pressure responsive means to be moved thereby to open said discharge port under pressure in said combustion chambers exceeding the retaining force of said yieldable means, air supply means supplying air under pressure above atmospheric and in communication with said combustion chambers, said last named communication having closing valve means therefor connected with said pressure responsive means to be moved thereby to close said communication when the pressure of combustion against said pressure responsive means exceeds the retaining force of said yieldable means, and means whereby said air as supplied is supplied with fuel for combustion therewith in said combustion chambers.

7. All means as set out in claim 6, and, a means for supplementary air supply to said combustion chambers, a communication therefrom to said combustion chambers, non-return valve means in said last named communication to permit flow to said combustion chambers during periods of low pressure in said combustion chambers prior to communication of said first named air supply with said combustion chambers.

ADOLPHE C. PETERSON.

REFERENCES CITED

The following references are of record in the file of this patent:

UNITED STATES PATENTS

| Number | Name | Date |
|---|---|---|
| 1,130,090 | Kutschinski | Mar. 2, 1915 |
| 1,457,871 | Bonsiakos | June 5, 1923 |
| 1,517,422 | Hall | Dec. 2, 1924 |
| 1,569,497 | Johnson | Jan. 12, 1926 |
| 1,980,266 | Goddard | Nov. 13, 1934 |
| 2,041,081 | Menzies | May 19, 1936 |
| 2,283,863 | Achterman | May 19, 1942 |
| D. 136,325 | Lateana | Sept. 7, 1943 |

FOREIGN PATENTS

| Number | Country | Date |
|---|---|---|
| 467,989 | Great Britain | June 28, 1937 |
| 147,026 | Great Britain | Oct. 6, 1921 |
| 636,026 | France | Jan. 6, 1928 |
| 265,351 | Germany | Oct. 6, 1913 |
| 695,180 | Germany | Aug. 19, 1940 |
| 305,188 | Italy | Jan. 30, 1933 |